United States Patent [19]

Carlson et al.

[11] Patent Number: 4,542,180

[45] Date of Patent: Sep. 17, 1985

[54] COMPOSITE LOW TEMPERATURE CURE LATEXES

[75] Inventors: Gary M. Carlson, North Olmsted; Frank A. Wickert, Olmsted Township, Cuyahoga County, both of Ohio

[73] Assignee: SCM Corporation, New York, N.Y.

[21] Appl. No.: 656,509

[22] Filed: Oct. 1, 1984

[51] Int. Cl.[4] ............................................. C08L 61/24
[52] U.S. Cl. ...................................... 524/512; 524/504; 524/831; 525/63; 525/162; 525/163
[58] Field of Search .................. 525/162, 163, 518; 524/512, 831, 504

[56] References Cited

U.S. PATENT DOCUMENTS 4,064,191 12/1977 Parekh .............................. 525/375
4,442,257 4/1984 Borovicka, Sr. et al. .......... 524/555
4,444,941 4/1984 Borovicka, Sr. et al. .......... 525/375

Primary Examiner—Theodore E. Pertilla
Attorney, Agent, or Firm—Thomas M. Schmitz

[57] ABSTRACT

Improved coating compositions comprise a coreactive polymeric mixture comprising a reactive emulsion polymer produced by copolymerizing ethylenic monomers in the presence of glycoluril dispersed in water to provide an in-situ blend of reactive polymer and glycoluril. Upon heat curing, the glycoluril cross-links with the reactive in-situ formed emulsion polymer.

4 Claims, No Drawings

COMPOSITE LOW TEMPERATURE CURE LATEXES

BACKGROUND OF THE INVENTION

This invention relates to thermosetting composite emulsion polymers and more particularly to an in-situ formed reactive emulsion polymer produced in the presence of a glycoluril crosslinker.

Glycoluril compositions are known for use in solvent based coating compositions such as disclosed in U.S. Pat. No. 4,064,191. Powder paints based on glycoluril are disclosed in U.S. Pat. Nos. 4,254,235, 4,255,558, and 4,118,437. Water dispersed emulsion polymers based on glycoluril mixtures are disclosed in U.S. Pat. No. 4,442,257 and commonly assigned U.S. Ser. No. 413,728 filed Sept. 1, 1982, (U.S. Pat. No. 4,444,941) and the disclosures thereof are incorporated herein by reference.

Aqueous latex coating compositions based on a thermosetting combination of glycoluril adapted to crosslink with a reactive polymer containing reactive carboxyl, hydroxyl, or acrylamide groups provide a low temperature cure surface coating. Low temperature water based coatings are highly desirable since less energy is required for curing and organic solvent emission pollution is avoided. The reactive emulsion polymer will cure with the coreactive glycoluril at surprisingly low temperatures of about 40° C. to 120° C. for 0.1 to 20 minutes, and advantageously less than 3 minutes. This quick and low temperature cure cannot be achieved with similar polymers now with conventional cross-linking compounds such as melamine.

It now has been found that coatings based on the combination of glycoluril and reactive emulsion polymer can be substantially improved by copolymerizing the monomers for synthesizing the reactive emulsion polymers in the presence of the glycoluril dispersed in water to produce an in-situ formed composite of reactive emulsion polymer and glycoluril. By synthesizing the reactive emulsion polymer in the presence of glycoluril, a better and more uniform dispersion of emulsion polymer results whereby a better incorporation of crosslinker into the emulsion polymer particles is formed in comparison to simple blending. Synthesizing the latex in an aqueous dispersion of glycoluril crosslinker/water solution, is believed to provided free-radical grafting on the crosslinker and some reaction of the crosslinker with hydroxyl functional monomer to give better incorporation of crosslinker into the particles thus preventing its diffusion into porous substrates.

The process of this invention provides coating compositions which provide uniform cured coating films, consistently clear films, and improved uniform gloss. The films applied over porous substrates avoids diffusion of one component such as glycoluril in preference to the matrix emulsion polymer and generally provides improved film integrity properties. Better interdispersion of the latex and glycoluril provides improved holdout and can enable lesser amounts of glycoluril to obtain comparable film physical properties. These and other advantages will become more apparent by referring to the detailed description and the illustrative examples.

SUMMARY OF THE INVENTION

Briefly, an in-situ formed composite of glycoluril and reactive emulsion polymer is produced by copolymerizing ethylenically unsaturated monomers, including reactive monomers, in the presence of a glycoluril derivative dispersed into water. The reactive monomers comprise hydroxyl, carboxyl, or acrylamide group containing monomers which can be copolymerized with other ethylenically unsaturated monomers.

DETAILED DESCRIPTION OF THE INVENTION

The process and composition of this invention pertains to polymerizing ethylenically unsaturated monomers including reactive carboxyl, hydroxyl, or acrylamide monomers, in the presence of glycoluril derivatives dispersed in water.

A predetermined weight ratio of glycoluril and reactive matrix polymer is utilized in proportion to the various monomers relative to the glycoluril predispersed into water prior to the in-situ polymerization of monomer. On a 100 weight parts basis of reactive matrix polymer, between about 5 and 100 weight parts of glycoluril are dispersed into water to provide between 10% and 50% aqueous solution of glycoluril derivative. Glycoluril can be dispersed into water to provide an aqueous dispersion by addition of an aqueous glycoluril solution to a preformed "seed" latex.

The ethylenic monomers can be polymerized in the aqueous dispersion of glycoluril at a pH preferably between about 1.0 and 6. Generally, the polymerization is conducted at a temperature of about 20°–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxgen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. The amount of initiator used will generally be in the range between about 0.1 to 3% by weight based on the monomers and preferably is maintained between 0.15 and 0.8% by weight. Incremental addition or proportioning of the initiator is usually employed.

When an emulsifier is used to prepare the in-situ formed emulsion polymer of this invention, the emulsifiers are of the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanolamine lauryl sulfate, ethylamide lauryl sulfate; alkali metal and ammonium salts of sulfonated petroleum or paraffin oils, sodium salts of aromatic sulfonic acids, such as dodecane-1-sulfonic acid and octadiene-1-sulfonic acid, aralkylsulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used. The amount of emulsifier used may be from about 0.01 to 6% or more by weight of the monomers. All the emulsifier may be added at the beginning of the polymerizing or it may be added incrementally or by proportioning throughout the run.

Typical polymerizations for the preparation of the in-situ formed reactive polymer in the presence of glycoluril in accordance with this invention are conducted by preparing a seed latex from 0.5-6% of the monomer and 10-50% of the initiator. The glycoluril is added followed by the remaining monomers which are added over 1-5 hours. The reactor and its contents are heated and the initiator added. The thermosetting composition of this invention can contain between 5% and 55% weight glycoluril derivative with the remaining being reactive matrix polymer. The preferred compositions contain between 15 and 35 weight parts glycoluril derivative per 100 weight parts reactive matrix polymer.

The thermosetting composition of this invention comprises in-situ formed reactive emulsion polymer containing reactive carboxyl, hydroxyl, or acrylamide groups adapted to be coreactive and cross-link with a glycoluril. The in-situ formed reactive emulsion polymer comprises copolymerized ethylenically unsaturated monomers including at least 2% copolymerized monomers of acrylamide, carboxyl monomer, or hydroxyl monomer. Preferably the polymer contains polymerized monomer by weight between 0.5% and 10% carboxyl monomer, and between 2% and 20% hydroxyl monomer, with the balance being other ethylenic monomers including acrylamide monomers. The acrylamide monomers can be acrylamide, methacrylamide, ethylacrylamide, acrylonitrile, methacrylonitrile, and similar alkyl acrylamide and methacrylamide monomers. Carboxyl containing monomers are ethylenically unsaturated monomers containing carboxyl groups such as acrylic, ethacrylic, or ethacrylic acid, as well as itaconic, citriconic, fumaric, maleic, mesaconic and aconitric acids. The preferred acids are acrylic and methacrylic acids. Hydroxyl containing monomers are ethylenically unsaturated monomers containing a hydroxyl and can include for example hydroxy alkyl acrylates or methacrylates such as hydroxyethyl, hydroxypropyl, hydroxybutyl, hydroxyhexyl hydroxyoctyl and similar lower alkyl hydroxy acrylates and methacrylates. Other ethlenically unsaturated monomers other than acrylamide carboxyl, and hydroxyl monomers can include vinyl unsaturated monomers containing vinyl double bond unsaturation including, for example, vinyl esters such as vinyl acetate, vinyl proprionate, vinyl butyrates, vinyl benzoate, isopropenyl acetate and like vinyl esters; vinyl amides, such as acrylamide; and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy or azo catalyst, common redox catalyst, ultraviolet radiation, or the like.

The reactive emulsion polymer containing reactive hydroxyl, carboxyl, or acrylamide groups is adapted to be cross-linked by reaction with a glycoluril derivative. Glycoluril derivatives are disclosed in U.S. Pat. No. 4,064,191 and are also known as acetylendiureas. Glycolurils are derived by reacting two moles of urea with one mole of glyoxal to provide a complex ring structure illustrated as follows:

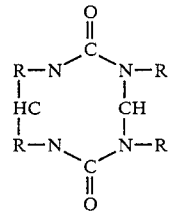

Wherein the R substitutes constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include, for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutyoxymethyl glycoluril, tetrakisamyloxymethyl glycoluril, tetrakishexoxymethyl glycoluril and the like.

Glycoluril derivatives further include dimethylol dihydroxy ethylene urea, which is believed to have a chemical structure as follows:

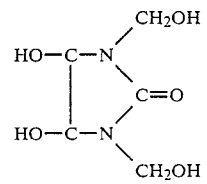

The ethylenically unsaturated monomers including reactive carboxyl, hydroxyl, or acrylamide monomers, are polymerized in the presence of aqueous dispersed glycoluril derivatives to produce a low temperature cure coating composition. The resulting thermosetting compositions cure quickly at low temperatures under either basic or acidic curing conditions although a faster cure results under acidic conditions. Acid catalyst such as p-toluene sulfonic acid is useful for accelerating the cure. The thermosetting composition can be used as a clear coating or as a pigmented coating.

The merits of this invention are further illustrated in the following examples.

EXAMPLE 1

| 1. D.M. Water | 515.5 g |
| Monawet MM-80 | 3.7 g |
| 2. Styrene | 14 g |
| Ethyl Acrylate | 10 g |
| 3. Ammonium Persulfate | 0.92 g |
| 4. TMGU (76% in water) | 702 g |
| Monawet MM-80 | 0.64 g |
| 5. Ammonium Persulfate | 2.4 g |
| D.M. Water | 230 g |
| 6. Styrene | 768 g |
| Ethyl Acrylate | 287 g |
| Hydroxyethyl Acrylate | 73 g |
| Methacrylic acid | 49 g |
| Monawet MT-70 | 6.4 g |
| 7. AWC Rice | 0.11 g |
| D.M. Water | 2 g |
| 8. Trigonox AW-70 | 1.48 g |
| D.M. Water | 3 g |

One was charged and heated to 80° C. under a nitrogen blanket. Two was then added followed by three. After a 15 minute hold period four was added over 20 minutes and the temperature raised to 80° C. Five and six were added simultaneously over approximately 4 hours followed by a 20 minute hold period. Seven was then added and held for 30 minutes. Eight was added and the latex cooled and filtered.

This latex was formulated into a paint by mixing together:

| Butyl Cellosolve | 53.68 g |
| D.M. Water | 8.66 g |
| Surfynol 104E | 4.0 g |
| Surfynol TG | 4.0 g |
| Neptune ISP-5 | 20.0 g |
| BYK 301 Slip aid | 3.0 g |
| Silicone Defoamer | 10.0 g |
| Rhoplex QR-708 | 2.0 g |
| Dapro DF-911 | 3.0 g |
| Latex #1 | 812.74 g |

The paint was catalyzed by adding 23.0 g of a 40 percent solution of p-toluenesulfonic acid in isopropanol. The catalyzed paint was applied over a hardboard panel and cured at 300 F. for 20 seconds. The final film had 180 double rubs MEK resistance, 42% gloss, and 100% tape release at a film thickness of 0.2 mils.

A similar paint prepared by post adding an equivalent amount of TMGU to a latex similar to this latex, without the TMGU present during the synthesis, resulted in a film having only 4 double rubs of MEK resistance, 12% gloss, and 0% tape release.

The presence of glycoluril during the latex synthesis results in much better film properties than those observed when the glycoluril is post-added to a final latex.

EXAMPLE 2

In a process substantially similar to Example 1, a latex was prepared in the presence of an aqueous TMGU solution using the following materials.

| 1. D.M. Water | 520 g |
| Monawet MM-80 | 3.7 g |
| 2. Styrene | 14 g |
| Ethyl acrylate | 10 g |
| 3. Ammonium Persulfate | 0.92 g |
| 4. TMGU (45% NV) | 1154 g |
| Monowet MM-80 | 0.65 g |
| 5. Ammonium Persulfate | 2.4 g |
| D.M. Water | 230.4 g |
| 6. Styrene | 769 g |
| Ethyl acrylate | 288 g |
| Hydroxyethyl acrylate | 73 g |
| Methacrylic acid | 49 g |
| Monawet AW-70/D.M. Water | 6.4 g |
| 7. AWC Rice | 0.11 g |
| D.M. Water | 2 g |
| 8. Trigonox AW-70 | 1.48 g |
| D.M. Water | 3.0 g |

This latex was catalyzed by adding a 40% solution of p-toluenesulfonic acid in isopropanol equal to 6% of the weight of the TMGU solids. The latex was applied over leneta test paper and cured at 300° F. for 20 seconds. The final film had 150 double rubs of MEK resistance. A latex of similar composition with the TMGU post added did not form an acceptable film.

EXAMPLE 3

In a process substantially similar to Example 1, a latex was prepared in the presence of aqueous TMGU having the following components.

| 1. D.M. Water | 514.2 g |
| Monawet MM-80 | 3.72 g |
| 2. Styrene | 14 g |
| Ethyl acrylate | 10 g |
| 3. Ammonium Persulfate | 0.92 g |
| 4. TMGU (45% NV) | 703 g |
| Monawet MM-80 | 0.65 g |
| 5. Ammonium Persulfate | 2.4 g |
| D.M. Water | 230 g |
| 6. Styrene | 770 g |
| Ethyl acrylate | 287 g |
| Hydroxyethyl acrylate | 74 g |
| Methacrylic acid | 49 g |
| Monawet (AW-70/D.M. Water | 6.5 g |
| 7. AWC Rice | 0.11 g |
| D.M. Water | 2 g |
| 8. Trigonox AW-70 | 1.48 g |
| D.M. Water | 3.0 g |

This latex demonstrates the advantages of replacing some water with TMGU as diluent for the latex synthesis. The final NV of this latex was 64.7. This is a higher solids level than can be attained by post-adding.

Five hundred one point four g. of this latex was mixed with 14.3 g of a 40% solution of p-toluenesulfonic acid in isopropanol. When applied and cured over leneta test paper a glossy film having over 300 double rubs MEK resistance was obtained after 20 seconds cure in a 300° F. oven. The above catalyzed latex, 400 g. was mixed with 20 g of butyl cellosolve and reapplied and baked to give a coating with over 400 double rubs MEK resistance.

EXAMPLE 4

| 1. D.M. Water | 664 g |
| Monawet MM-80 | 4 g |
| 2. Styrene | 15.5 g |
| Ethyl acrylate | 13 g |
| 3. Ammonium Persulfate | 1.0 g |

| -continued | |
|---|---|
| 4. TMGU (45% NV) | 742 g |
| Monowet MM-80 | 0.7 g |
| 5. Ammonium Persulfate | 2.6 g |
| D.M. Water | 250 g |
| 6. Styrene | 835 g |
| Ethyl acrylate | 308 g |
| Hydroxyethyl acrylate | 80 g |
| Methacrylic acid | 53 g |
| Monawet AW-70/D.M. Water | 8 g |
| 7. AWC Rice | 0.12 g |
| D.M. Water | 2 g |
| 8. Trigonox AW-70 | 1.6 g |
| D.M. Water | 3.0 g |

In a process similar to Example 1, a latex was prepared from the above materials. Two hundred grams of this latex was mixed with 88.1 g. of TMGU (76 NV). Eighty grams of this solution was mixed with 20 g. of M-Pyrol and 5.27 g of aqueous p-toluenesulfonic acid (40%).

A film was drawn down over leneta paper and baked in a 300° F. oven for 30 seconds to give a film which was glossy, clear and had excellent holdout over the uncoated portion of the paper.

The in-situ polymerization of monomers in the presence of aqueous dispersed glycoluril derivative results in better dispersion of latex in the crosslinker water solution which provides films with better clarity and gloss then other coatings having equal levels of TMGU post-added.

We claim:

1. In a process for providing a polymeric composition comprising glycoluril and reactive copolymer the process steps comprising:
providing an aqueous dispersion of glycoluril derivative dispersed into water, and copolymerizing ethylenically unsaturated monomers in the presence of the aqueous dispersion of glycoluril derivative to provide an in-situ formed emulsion polymer mixture of glycoluril derivative and reactive matrix copolymer of copolymerized monomers, said emulsion polymer mixture containing on a solids weight basis between 5% and 55% glycoluril derivative, and said monomers comprising between 0.5% and 10% carboxyl monomer and between 2% and 20% hydroxyl monomer with the balance being other ethylenically unsaturated monomers including acrylamide monomers.

2. The process of claim 1 wherein the emulsion polymer mixture comprises between 15 and 35 weight parts of glycoluril per 100 weight parts of said reactive matrix polymer.

3. The process of claim 1 wherein the glycoluril derivative is a methylol glycoluril.

4. The process in claim 1 wherein the glycoluril derivative is dimethylol dihydroxy ethylene urea.

* * * * *